July 16, 1935.   O. H. COOLIDGE ET AL   2,008,061
APPARATUS AND METHOD FOR REMEDYING CROSSTALK
Filed Oct. 19, 1933   2 Sheets-Sheet 1
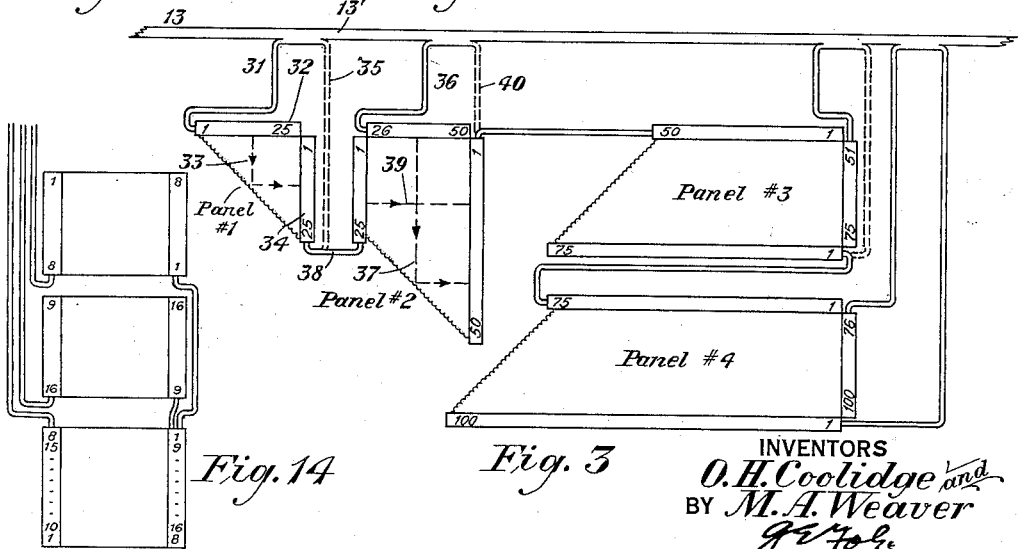
INVENTORS
O. H. Coolidge and
BY M. A. Weaver
ATTORNEY July 16, 1935. O. H. COOLIDGE ET AL 2,008,061
APPARATUS AND METHOD FOR REMEDYING CROSSTALK
Filed Oct. 19, 1933    2 Sheets—Sheet 2
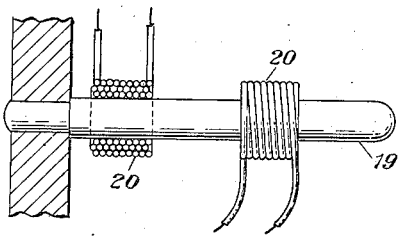
Fig. 8
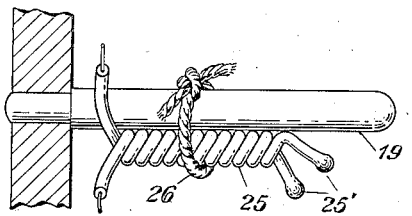
Fig. 9
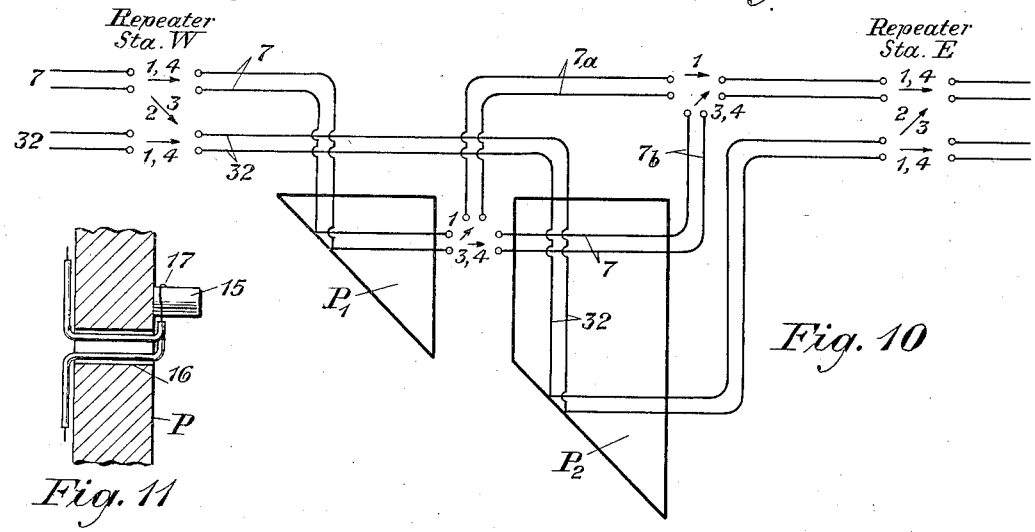
Fig. 10
Fig. 11
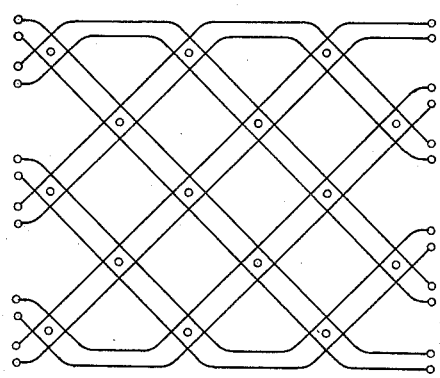
Fig. 12
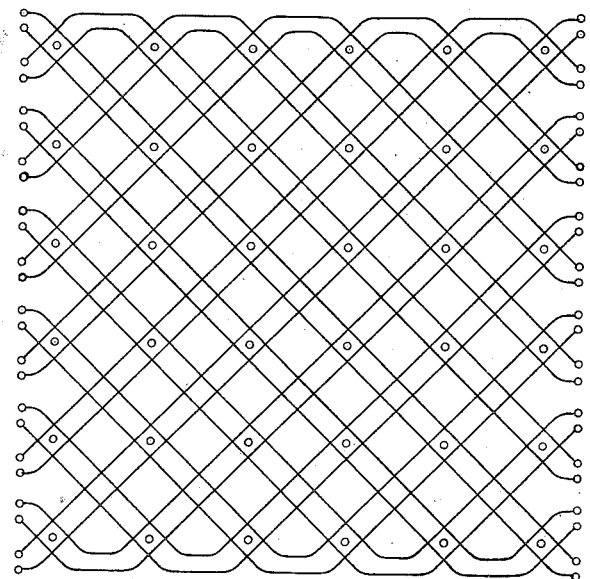
Fig. 13
INVENTORS
O. H. Coolidge and
BY M. A. Weaver
ATTORNEY Patented July 16, 1935

2,008,061

UNITED STATES PATENT OFFICE 2,008,061

APPARATUS AND METHOD FOR REMEDYING CROSSTALK

Oliver H. Coolidge, Bedford Hills, and Myron Alexander Weaver, Rye, N. Y., assignors to American Telephone and Telegraph Company, a corporation of New York Application October 19, 1933, Serial No. 694,304

15 Claims. (Cl. 179—78)

Among the objects of our invention is to provide a method and suitable apparatus for eliminating crosstalk in signaling circuits. Another object is to correct for crosstalk in a system of transmission lines existing side by side. Other objects are to provide a system of transmission lines interrelated so as to reduce crosstalk as far as practicable and with suitable adjustable elements associated therewith further to reduce the crosstalk. Still another object is to provide a board or panel on which the crosstalk balancing elements may be carried conveniently. Another object is to provide a routine for enlarging such a board without interruption of service. All these objects and other objects and advantages of our invention will become apparent on consideration of a limited number of specific examples of practice in accordance with the invention which we will disclose in the following specification. It will be understood that this disclosure has relation primarily to these particular examples of the invention, and that the scope of the invention will be indicated in the appended claims.

Referring to the drawings, Figure 1 is a diagram of two telephone lines between which there may be crosstalk and provided with means to correct such crosstalk; Fig. 2 is a diagram showing the arrangement of conductor pairs on a board designed to carry adjustable compensating elements; Fig. 3 is a diagram showing a board or panel in sections; Fig. 4 is a simplified diagram showing a special arrangement of panel sections; Figs. 5 and 6 are diagrams showing two types of panel section units of which a number may be combined to take care of any number of conductor pairs; Fig. 7 is a diagram showing several units of the types of Figs. 5 and 6 in combination; Fig. 8 is a diagrammatic elevation partly in section showing an inductance balancing unit; Fig. 9 is a similar diagram showing a capacity balancing unit; Fig. 10 is a diagram to which reference will be made in explaining how the number of lines balanced may be increased without interruption of service; Fig. 11 is a detailed section showing the association of conductor with a soldering lug on the panel; Figs. 12 and 13 are diagrams showing an alternative system of arrangement of the conductor pairs on the panels; and Fig. 14 is a diagram showing a combination of the panels of Figs. 12 and 13.

When two signaling circuits extend close together, the existence of signaling currents in one circuit may have a tendency to set up corresponding currents in the other circuit, the phenomenon known as "crosstalk". The currents in one circuit may act to develop currents in the other circuit by mutual inductance between the two circuits, or by mutual capacity, or both. The objectionable phenomenon may occur when two circuits extend side by side each in the form of a conductor pair within one and the same cable, or each in the form of an open wire line both on the same row of poles. In a cable this tendency is obviated in considerable degree by twisting the two conductors of each pair together so that the inductance and capacity effects of one conductor pair on neighboring pairs are balanced out for the most part. In open wire lines the conductors of each pair are systematically transposed so that the influence upon neighboring pairs and the influence from them are balanced out for the most part. However, in many cases of long transmission lines, either in cables or in open wire lines, in spite of such twisting or transposing of the conductors, there will be some accidental dissymmetries and therefore some degree of crosstalk between one circuit and another unless further corrective adjustment is made.

When the conductor pairs in a cable are used for carrier current operation, and especially when they are so used as non-loaded lines with repeater stations rather near together, the phenomenon of residual crosstalk may need especially to be remedied.

In one aspect our invention relates to make practicable compensating adjustments to remedy the crosstalk between the neighboring circuits of long cables or between multiple open wire lines.

Referring to Fig. 1, this is a diagram showing the two twisted pairs 1—1' and 2—2' of a cable extending between two consecutive repeater stations. At these stations each pair is terminated in apparatus having the characteristic impedance R which is the characteristic impedance of either line. The modulated carrier current applied at the left end to the pair 1—1' comprises components of various frequencies, and at various places along the line there may be some unbalanced or residual inductance and capacity effects from one side or the other of the pair 1—1' into one side or the other of the pair 2—2'. Thus there may be a certain residual or unbalanced mutual inductance between the conductor 1' and the conductor 2', as indicated by $m_1$, and/or there may be a capacity effect between these conductors, as indicated by $c_1$. At other places along the length of these lines there may be other inductance and capacity effects, as at $m_2$ and $c_2$.

At any convenient place along the length of the repeater sections shown in Fig. 1 a panel P is installed and arranged so that adjustable mutual inductances such as $m_3$ and/or adjustable capacities such as $c_3$, may be connected across from a conductor of one pair to a conductor of another pair so as approximately to neutralize the residual crosstalk due to such connections, as at $m_1c_1$ and $m_2c_2$.

The panel P may be located anywhere along the length of the repeater section. An advantage in having it near one end will be the greater convenience in having it assembled at a repeater station so that it can be cared for and attended along with that station. On the other hand, the inevitable slight irregularity of impedance termination at the ends of the section makes it somewhat advantageous on this account to have the panel P halfway between the repeater stations. In Fig. 1 we have shown it located at the halfway place.

As will appear presently, the two conductors 1 and 1' of a pair may extend for a considerable distance across the panel P and as here related, the circuit will have a different characteristic impedance from that where the two conductors are twisted together, as in the cable. To avoid impedance irregularity it may be desirable to introduce properly adjusted shunt capacities, such as 11, where the pair enters and leaves the panel P, or series inductances may be the proper elements at these points, as indicated at 12 for the pair 2—2'. These compensating elements 11 and 12 depend for their nature and adjustment not only on the electrical constants of the respective pairs and their disposition in their extent across the panel P, but also on the electrical constants of the cross-connecting reactance elements such as $m_3$ and $c_3$.

The general principle of arrangement of the pairs on the panel P is given by the diagram in Fig. 2. The cable 13—14 extending past the panel P in Fig. 2 is interrupted at 13 and 14 and each of its pairs is led across the panel P along a course as shown in this figure. Five pairs are shown, and it will be seen that each of them crosses each of the others once and only once at a right angle. Any such crossing place may be designated definitely by the numbers of the pairs as for example 1—2 or 7—20, and such a panel may appropriately be called a coordinate type panel or board. In this particular case the number of intersections will be $(5 \times 4)/2$ and in general, for $n$ pairs, the number of intersections will be $n(n-1)/2$. At each such intersection inductance and/or capacity connections may be made from either side of one pair to either side of the other pair, as has been shown in Fig. 1 for the pairs there designated 1—1' and 2—2'.

The conductors of the pairs shown in Fig. 2 may be carried along the back side or the front side of the board or panel P. They may be rubber-covered and are kept as close together as practicable so as to reduce the inductive and capacity effects in relation to other pairs. On the front face of the board are soldering lugs, such as 15 in Fig. 11, and a conductor may be looped through a hole 16 in the panel P and soldered, as at 17, to such a lug. To minimize the danger of contacts between lugs, the lugs 15 on the two sides of a pair are not placed opposite each other but are in staggered relation, as shown in Fig. 2.

As close as practicable to each intersection of two pairs there is a hole through the board P, as at 18 in Fig. 2, and supported in this hole is a small rod, such as 19 in Fig. 8 and Fig. 9. Adjustable mutual inductance coils, such as 20, may be provided as shown in Fig. 8. Here the adjustment of mutual inductance is made by sliding the coils 20 relatively to one another on the rod 19. The ends of these coils will be soldered to the proper lugs as, for example in Fig. 2, the conductor 2' may be interrupted at $x$ and the ends of one inductance coil connected respectively to the two lugs 21 and 22. Then the ends of the other coil of the same mutual inductance pair may be connected to the lugs 23 and 24, with interruption of the conductor 4 at a point $x'$ between these two lugs 23 and 24.

If a capacity element is needed between two pairs it may consist of two insulated wires twisted together such that any suitable length of this twisted pair may be cut off and utilized. Such a twisted pair capacity unit is shown at 25 in Fig. 9. It is supported by being tied by a piece of twine 26 on the rod 19 and its inner ends are connected respectively to two appropriate lugs as, for example, at 27 and 28 of Fig. 2 without interruption of the conductors. The outer ends of the wires of coil 25 are covered with insulation as at 25'.

The proper correction between two pairs will be between one side of one pair and one side of the other pair, and this will be effected by a mutual inductance between those sides, or a capacity. But if it is necessary to use both inductance and capacity, as shown in Fig. 1, this can readily be accomplished.

It will be seen that the pairs of parallel conductors 1, 2, 3, 4 and 5 stretching across the panel P of Fig. 2 are substantially equal in length, and although the twisted pair leads at their upper ends are unequal, this inequality is compensated by the inequality of the twisted pair leads at the right hand side so that the pairs are alike from the cable end 13 to the cable end 14, and therefore there will be the same attenuation in each of them.

Carrying the conductors of a pair in parallel to one another across the board, as in Fig. 2, results in a greater residual mutual inductive and capacity effect between one pair and another than if these conductors were twisted together. But, for the relatively short lengths involved such effects are not excessive provided wires of the same pair are much closer together than wires of different pairs and, moreover, such effects can be balanced out by the use of the adjustable units, such as in Fig. 8 and Fig. 9 along with residual crosstalk effects throughout the length of the conductor pairs between repeater stations.

When many conductor pairs in a cable are appropriated for carrier current use, quite a large board may be required to bring each pair in convenient relation to each other pair according to the plan of Fig. 2. The number of intersections of pairs has already been expressed in the formula $n(n-1)/2$, so that when the number of pairs is large the number of intersections varies about as the square of the number of pairs. Therefore, it may be advantageous to build the panel in sections. Another reason why sectional construction may be advantageous is that a certain number of pairs in a cable may be appropriated at one time for carrier current use and a suitable panel section provided; then at a later time if additional pairs in the cable are to be put to carrier current service, it will be advantageous to add one or more additional sections to the panel for balancing all the pairs against each other, rather than to reconstruct the entire panel.

Referring to Fig. 3, this is a diagram representing an installation of panels made in four successive stages. In the first stage 25 conductor pairs were cared for in panel #1. At a later stage 25 more pairs were appropriated in the cable for carrier current service and panel #2 was added, as will be explained presently in greater detail. In a third stage panel #3 was added to care for additional lines 51 to 75, and in a fourth and final stage panel #4 was added to care for lines 76 to 100. Of course each additional panel had to provide for balancing cross-connections between any two of the added pairs, and between any one of the added pairs and any previously appropriated pair.

Considering the state of affairs immediately after the installation of panel #1 in Fig. 3, it will be understood that the cable 13 has 100 or more pairs of which 25 pairs are taken down through the branch cable 31 into the sealed chamber 32, whence they are spread out downwardly and toward the right, as indicated for example by the line 33 on panel #1 and as indicated more in detail in Fig. 2. Each pair such as 33 enters the sealed chamber 34 at the right of panel #1 and the pairs are gathered together into the branch cable 35 and continued in normal fashion in the part of the main cable designated 13'. The numerals "1" and "25" on the sealed chambers 32 and 34 are intended to indicate the order of the pairs, corresponding in this respect with Fig. 2 where we see the numbers "1", "2", "3", "4" and "5" going across the top from left to right and down the right-hand side from top to bottom.

Now, suppose it is desired to increase the number of carrier current pairs from 25 to 50. Panel #2 will be added, and pairs 26 to 50 will be taken off in the branch cable 36 and led down and across panel #2 as indicated, for example by the dotted line 37, and in the lower triangular part of panel #2 there will be opportunity for cross-connection between any one of the pairs 26 to 50 and any other of those pairs. But, of course, it now becomes necessary to provide for possible corrective cross-connections between any one of pairs 1 to 25 and any one of pairs 26 to 50, and this will be effected by interrupting the branch cable 35 and connecting the branch cable 38 and carrying the pairs 1 to 25 across panel #2 as indicated, for example, in the dotted line 39.

With the foregoing detailed explanation of how the addition of panel #2 is effected, it will readily be understood how panels #3 and #4 may be rigged up when lines 51 to 75 and 76 to 100 are added to the equipment in carrier current service.

These different panels #1, #2, #3 and #4 may be placed in any convenient way, either housed in one room or in different rooms, as may be found convenient. If it is desired to group them in a rectangular plane area they may be grouped as indicated in Fig. 4, the connecting cables being disposed suitably for this purpose.

When connections are made for additional lines to be put in carrier current service, it will be desirable to do this without interrupting service on the lines already appropriated. We shall now describe a routine for this purpose, with especial reference to Fig. 10. The general similarity of arrangement between Fig. 10 and panels #1 and #2 of Fig. 3 will be readily apparent. With the panel $P_1$ in service, four stages of operation will now be described to add the panel $P_2$ so that both panels $P_1$ and $P_2$ shall be in service. To illustrate, pair No. 7 of pairs 1 to 25 is carried across panel $P_1$, and pair No. 32 of pairs 26 to 50 is carried across panel $P_2$, as represented in Fig. 10. The convention is employed in Fig. 10 that the connections indicated by the arrows are established during, and only during, the stages whose numbers are written down alongside those arrows. Thus stage No. 1 is the stage in which we have pair No. 7 connected across panel $P_1$. This stage can be readily verified by tracing the pair No. 7 completely across from left to right making the connections indicated by arrows marked 1. Without interfering with the pairs such as 7 in any way, panel #2 is installed and connected across for the pairs 26 to 50, of which pair 32 is shown by way of example. On the panel $P_2$ all the pairs 26 to 50, such as pair 32, are balanced against one another for crosstalk. This is accomplished by the use of suitably adjusted reactance elements on the lower part of panel $P_2$, and in no way interferes with the operation of pairs 1 to 25. So much for stage No. 1.

At repeater stations W and E, the pairs of the group 1 to 25 are interrupted and "patched" to the pairs of the group 26 to 50 respectively. Thus, for example, pair 7 on the left is disconnected from pair 7 extending to the right of station W and is connected to pair 32 extending to the right from station W. In this second stage this connection is indicated by the numeral "2" on the diagonal arrow at station W. Thus the pair terminals 7 are "patched" on the pair 32 which goes across the panel $P_2$. This change can be very quickly made at the repeater stations W and E, that is, to disconnect the twenty-five pairs 1 to 25 and reconnect them through the respective pairs 26 to 50. Since the pairs 26 to 50 have already been balanced for crosstalk on the lower part of panel $P_2$, they are ready for such service. So much for stage No. 2.

In stage No. 3 such pairs as 7 are disconnected at the right of panel $P_1$ from the cable and reconnected to the corresponding pairs on panel $P_2$. This reconnection is indicated by the arrow with the numeral "3" between the panels $P_1$ and $P_2$. At the same time the pair terminals at the upper right on panel $P_2$ are connected into the cable. Stated briefly, the connection of such a pair as 7 is broken through the conductors 7a and made through the conductors 7b which extend across the upper part of the panel $P_2$. So much for the third stage.

In the fourth stage the changes of connection that were made by patching are now restored to their original status, as indicated by the arrows carrying the numerals "4". The pairs 1 to 25 have been balanced among themselves on panel $P_1$ and the pairs 26 to 50 have been balanced among themselves on the lower part of panel $P_2$. It becomes necessary, however, to balance each of the pairs 1 to 25 against each of the pairs 26 to 50 on the upper part of panel $P_2$. To do this with the least interruption of service the measurements may be made at some frequency lying between the carrier current channels. Or, for the time being, one channel on each pair could be killed in order to provide a testing frequency, thus killing a working channel on each of the pairs 1 to 25. These temporarily unavailable channels could be made good by using some other channel over pairs 26 to 50. These temporary channels should preferably be located at the lower end of the frequency spectrum as this would minimize the crosstalk during the temporary condition. When balancing is completed between 1—25 and 26—50, the temporarily killed channels are restored.

To standardize a simplified procedure it may be desirable to have only two types of panels, such as shown in Figs. 5 and 6, which may be called, respectively, triangular and square. The use of a triangular panel will be readily understood as shown in Figs. 3 and 10. Also, in those figures, it will be seen that panel #2, for example, could be formed of a square panel and a triangular panel. Similarly, in Fig. 3 panel #3 could be replaced by a triangular panel and two square panels and panel #4 could be replaced by a triangular panel and three square panels.

With the two types of panels shown in Figs. 5 and 6, Fig. 7 is equivalent to panels #1 and #2 of Fig. 3, except for the lengths of wires in the sealed chamber at the edges of the panels. That is, if panel #2 of Fig. 3 is broken apart into a square panel and a triangular panel, this give Fig. 7. The numerals "1", "25", "26" and "50" on Fig. 7 are carefully disposed to show the order of arrangement of the conductor pairs on each panel or panel section. The dotted lines marked "7" indicate the course of pair No. 7 across the panels, and the dotted lines marked #32 indicate the course of pair No. 32 across the panels. It will be seen that the arrangement gives equal lengths across both the panels, and in the sealed chambers the leads total the same length for each pair, and in the branch cables the lengths total the same for each pair. While the panels or panel sections are shown in Fig. 7 grouped in a convenient overall rectangular arrangement, this is not necessary as they can be grouped in any other convenient way.

In Fig. 12 we have shown the plan of a modification of the panel as compared with Fig. 2 for the convenient cross-connection of adjusting reactances between pairs. If $n$, the number of pairs, is even, we prepare the diagram of this figure by first marking $n/2$ columns of units each with $n/2$ units per column. Then we place $n/2-1$ rows of units (each with $n/2$ units per row) in alternation with the previous rows and depressed so that their columns will be in alternation with the previous columns. This gives us the disposition of units indicated by the little circles in Fig. 12. Then it is easy to draw the diagram of the pairs as shown in this figure so that at one or another unit each pair will intersect each other pair once, and only once.

If $n$ is odd, the first step is to place $(n+1)/2$ columns and $(n-1)/2$ rows, then add $(n-1)/2$ columns each of $(n-1)/2$ units alternating with the original columns and in such a way that their rows alternate with the original rows.

A panel constructed according to the plan of Fig. 12 will have a compact nearly square shape and will require only two sealing chambers, one at each side.

Figure 13 shows a somewhat similar panel adapted for establishing corrective connections between any one of one set of pairs and any one of another like set of pairs. It will be seen that Fig. 13 is much like Fig. 12 but has alternate units omitted, whereby it can be crowded somewhat closer together. Fig. 14 shows the panels of Figs. 12 and 13 assembled in combination. Compared with Fig. 7, the two smaller panels of Fig. 14 correspond to the two triangular panels of Fig. 7, and the larger panel of Fig. 14 corresponds to the square panel of Fig. 7.

A panel constructed according to either Fig. 12 or 13 has the advantage that preceding the point where corrective connection is made between any two conductor pairs, there will be about the same number of corrective connections on one pair as on the other pair. Hence, the cumulative phase shift, such as it may be, due to corrective connections, will be about the same along each pair to the point where the corrective connection is made between these pairs. Accordingly, the corrective connection between these pairs will be effective alike for crosstalk either way; whereas if the number of corrective connections preceding the point mentioned were substantially different along one pair from what it is along the other pair, the resultant difference of phase shift would at best make the correction a matter of compromise.

We claim:

1. A plurality of conductor pairs, and means for balancing crosstalk between any two of them comprising a supporting panel for said pairs across which each pair extends with a change of direction so that each pair intersects each other pair, and adjustable units located at the intersection points, each such unit being adapted for connection between a side of one pair and a side of the other pair that intersect at that point.

2. A plurality of conductor pairs, and means for balancing crosstalk between any two of them comprising a triangular supporting panel for said pairs across which each pair extends with a single change of direction, the two parts of each pair of different direction being parallel respectively with two sides of the panel so that each pair intersects each other pair, and adjustable units located at the intersection points, each such unit being adapted for connection between a side of one pair and a side of the other pair that intersect at that point.

3. A plurality of conductor pairs, and means for balancing crosstalk between any two of them comprising a supporting panel for said pairs across which each pair extends with a change of direction so that each pair intersects each other pair, compensating units, and staggered soldering lugs mounted on the panel and distributed along the sides of each pair for attachment of said compensating units where one pair intersects another pair.

4. In combination, a cable comprising a plurality of conductor pairs, an interposed panel, each pair being supported on the panel and carried partway along one side of the panel, then across the panel parallel to another side thereof, again across parallel to the first side, and then the remainder of the way along said second side away from the first side, with each pair intersecting each other pair and with the pairs of equal length adjacent to the panel.

5. In combination, a cable comprising twisted pairs, an interposed panel, each pair being supported on the panel and carried in twisted form part way along one side of the panel, then in parallel-wire form across the panel parallel to another side thereof, again in the same form across parallel to the first side, and then in twisted form the remainder of the way along said second side away from the first side with the twisted parts of equal length between pair and pair and with the parallel-wire parts of equal length between pair and pair.

6. In combination, a cable in two sections, an interposed panel between the ends of these sections, crosstalk correcting units adapted to be mounted on said panel, said cable comprising a plurality of twisted pairs, and equal length parallel pairs across the panel and supported thereby, each last mentioned pair intersecting each of the others and each connected at its ends with twisted pair extensions of the pairs in the cable, these extensions for each pair being of equal length with the extensions for the other pairs.

7. In combination, a cable comprising a plurality of conductor pairs, an interposed panel, apparatus units adapted to be mounted on said panel in association with any two of these pairs, each of a plurality of pairs in the cable being supported by the panel and carried across it so as to intersect each of the other such pairs, and impedance equalizing elements associated with the pairs where they enter and leave the panel.

8. A multiconductor system comprising conductor pairs, a sectional panel and associated elements for balancing crosstalk between them comprising a triangular section for balancing between pair and pair of one set of pairs and a four-sided section for balancing between each pair of one set of pairs and each pair of another set of pairs.

9. In combination, a plurality of conductor pairs, two panels, the said conductor pairs being in two sets, the pairs of one set extending across one panel with each such pair intersecting each of the other pairs of that set, and the pairs of both sets extending across the other panel, each pair of one set intersecting all the pairs of the other set.

10. A multi-conductor system comprising conductor pairs, a sectional panel and associated elements for balancing crosstalk between them comprising a section for balancing between pair and pair of one set of pairs and another section for balancing between each pair of such set and each pair of another set of pairs, said pairs extending across the sections in equal length and the total lengths of the connections to the pairs at their ends being of equal length.

11. A multi-conductor system comprising conductor pairs, a panel and associated elements for balancing crosstalk between them comprising sealed chambers on at least two sides of the panel, parallel conductor pairs extending across the face of the panel from chamber to chamber, each pair intersecting another pair, a cable, and twisted pair conductors within the sealed chambers connecting the panel pairs to the cable.

12. A multi-conductor system comprising conductor pairs, a panel and associated elements for balancing crosstalk between them comprising sealed chambers on at least two sides of the panel, parallel conductor pairs extending across the face of the panel from chamber to chamber, each pair intersecting other pairs, and twisted pair conductors within the sealed chambers connecting the panel pairs to the ends of a cable, the total length of twisted pairs connections within the sealed chambers being approximately the same for all the pairs.

13. The method of installing a crosstalk balancing panel for additional lines of a multi-conductor system which consists in first balancing the additional lines against each other, then patching the lines already in service to these balanced additional lines, then reconnecting the lines first in service in readiness to be balanced with the additional lines and then reversing the connections that were established by patching.

14. In combination, a plurality of conductor pairs, three panels, the said conductor pairs being in two sets, the pairs of one set extending across one panel with each pair intersecting each other pair of that set, the pairs of the other set extending similarly across another panel, and the pairs of both sets extending across the remaining panel with each pair of one set intersecting each pair of the other set.

15. A multi-conductor system comprising pairs, sectional equipped panels for balancing between the pairs of a multi-conductor system comprising triangular panels on each of which each pair is led with a change of direction across the panel so as to intersect each other pair, and square sections on each of which one set of pairs is led across the panel one way and each of another set of pairs is led across the panel another way so that each pair of one set intersects each pair of the other set.

OLIVER H. COOLIDGE.
MYRON A. WEAVER.